United States Patent
Guenard et al.

(10) Patent No.: US 10,488,998 B2
(45) Date of Patent: Nov. 26, 2019

(54) TOUCH-SENSITIVE INTERFACE WITH SHELL MOUNTING, TOUCH-SENSITIVE SHELL, AND MECHANICAL STRESS SENSORS

(71) Applicant: COMMISSARIAT A L'ENERGIE ATOMIQUE ET AUX ENERGIES ALTERNATIVES, Paris (FR)

(72) Inventors: Nicolas Guenard, Gif-sur-Yvette (FR); Christian Bolzmacher, Montrouge (FR); Terence Thomas, Bures-sur-Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 13 days.

(21) Appl. No.: 15/742,295

(22) PCT Filed: Jul. 6, 2016

(86) PCT No.: PCT/FR2016/051716
§ 371 (c)(1),
(2) Date: Jan. 5, 2018

(87) PCT Pub. No.: WO2017/006057
PCT Pub. Date: Jan. 12, 2017

(65) Prior Publication Data
US 2018/0203543 A1    Jul. 19, 2018

(30) Foreign Application Priority Data
Jul. 7, 2015   (FR) ...................................... 15 56412

(51) Int. Cl.
*G06F 3/044*        (2006.01)
*G06F 3/041*        (2006.01)

(52) U.S. Cl.
CPC ............ *G06F 3/044* (2013.01); *G06F 3/0414* (2013.01)

(58) Field of Classification Search
CPC .............................. G06F 3/044; G06F 3/0414
See application file for complete search history.

(56) References Cited

U.S. PATENT DOCUMENTS

| 3,657,475 A | 4/1972 | Peronneau et al. |
| 4,511,760 A | 4/1985 | Garwin et al. |
| (Continued) | | |

FOREIGN PATENT DOCUMENTS

| EP | 0 531 815 B1 | 1/1999 |
| EP | 2 413 221 A1 | 2/2012 |
| (Continued) | | |

OTHER PUBLICATIONS

International Search Report dated Oct. 5, 2016, in PCT/FR2016/051716 filed Jul. 6, 2016.

*Primary Examiner* — Patrick N Edouard
*Assistant Examiner* — Eboni N Giles
(74) *Attorney, Agent, or Firm* — Oblon, McClelland, Maier & Neustadt, L.L.P.

(57) ABSTRACT

A touch-sensitive interface includes a shell mounting and a touch-sensitive shell having: a main area without attachment; a peripheral area to be supported by the shell mounting; a first face touch-accessible by a user; a second face located opposite the first face, against which are arranged supporting, in the main area, several mechanical stress sensors rigidly connected to the shell mounting. Several attachment elements are arranged such that: each attachment element establishes a localized attachment of the touch-sensitive shell against the mounting thereof, at the border between the peripheral and main areas; each sensor, rigidly connected to the shell mounting at a constant non-zero distance from the associated localized attachment, is subject (Continued)

to minimal out of charge mechanical stress so as to create an out of charge mechanically prestressed pivot link between the touch-sensitive shell and the mounting thereof around the localized attachment.

10 Claims, 2 Drawing Sheets

(56) References Cited

U.S. PATENT DOCUMENTS

| | | | |
|---|---|---|---|
| 2009/0116339 A1 | 5/2009 | Ing | |
| 2010/0103640 A1* | 4/2010 | Brown | G06F 3/0414 |
| | | | 361/829 |
| 2011/0273389 A1* | 11/2011 | Hibara | G06F 3/0414 |
| | | | 345/173 |
| 2012/0200789 A1 | 8/2012 | Moelne et al. | |

FOREIGN PATENT DOCUMENTS

| | | |
|---|---|---|
| FR | 3 003 030 B1 | 9/2014 |
| WO | 2011/098854 A1 | 8/2011 |

\* cited by examiner

A-A

TOUCH-SENSITIVE INTERFACE WITH SHELL MOUNTING, TOUCH-SENSITIVE SHELL, AND MECHANICAL STRESS SENSORS

BACKGROUND

The present invention relates to a touch-sensitive interface with shell mounting, touch-sensitive shell, and mechanical stress sensors.

An application outlined is the use of mechanical stress sensors, in particular, capacitive sensors, to make any surface touch-sensitive, whatever the material thereof (subject to it having elastic properties) and whatever the shape thereof (flat or embossed), the size thereof and the arrangement (horizontal, tilted or vertical).

Currently, the technologies used are mainly deploying a capacitive film on the shell surface to make it touch-sensitive, or placing an infrared frame around this surface. In the first case, illustrated, for example, by the patent application WO 2011/098854 A1, a plastic film wherein an electrical network connected to a calculation unit is embedded, extends over the surface. At the time of touching with a finger, the capacity measured is locally impeded, which enables the touch to be localized. But this technology is detrimental to the transparency of the surface whereon the film meshed with electrical wires is deployed, and deploying such a plastic film on an embossed surface can quickly prove to be problematic. In the second case, the frame is composed of emitting and receiving infrared light-emitting diodes arranged respectively horizontally and vertically opposite, so as to generate a surface grid pattern. When a finger or any other object cuts the horizontal and vertical beams, it is localized. However, this technology is very sensitive to sunlight, which is full of infrared rays, as well very sensitive to the environment (dirt). In addition, the surface must be flat. Moreover, in the two above-mentioned cases, the actual cost is high and quickly increases according to the size of the surface to make touch-sensitive. If this actual cost is wanted to be reduced, at the same time, the performance of the touch-sensitive interface is very substantially reduced.

Other technologies used are based on the propagation of acoustic waves, like for example, in the patent application US 2009/0116339 A1. But these technologies are sensitive to the environment, in particular, to temperature, and can require to be obligatorily learned about before they are used. In addition, the need to have to transmit an energy to the touch-sensitive interface from a touch to detect limits the possibilities of interpreting this touch. Moreover, the complexity of the learning quickly increases according to the size of the surface to make touch-sensitive.

Another solution is thus to arrange a certain number of mechanical stress sensors against the shell to make touch-sensitive, regardless of the size thereof and to apply a method based on a measurement of the respective stresses exerted on each sensor at the time of a touch to deduct from it, by barycentric calculation, the touch localization. Such a method is, for example, disclosed in the U.S. Pat. No. 3,657,475. A minimum of two sensors is necessary for a one-dimensional touch localization in relation to an axis. A minimum of three sensors is necessary for a two-dimensional localization, knowing that four sensors arranged in the four corners of a rectangular, flat shell enable to obtain satisfactory results with a good stability of the unit.

The U.S. Pat. No. 3,657,475 discloses four sensors interposed between a fixed mounting and a touch-sensitive surface at the four corners of the latter. These sensors are stress gauges or piezoelectric sensors. They must, on the one hand, support the out of charge weight of the touch-sensitive surface and, on the other hand, remain sensitive to touches of which the force or pressure is added to the weight of this touch-sensitive surface. The force of the touch cannot therefore be too low in relation to the weight of the surface to not lead to sensitivity problems as well as problems with precision. In addition, the sensors used in this document are quite expensive and piezoelectric sensors, in particular, are sensitive to temperature variations.

For these reasons, the invention is more specifically based on a touch-sensitive shell interface, against which mechanical stress sensors are arranged, for example, capacitive sensors, which are known to be cheap.

But in a context of a touch-sensitive surface sensitive to touches, capacitive sensors themselves can raise sensitivity or precision problems such as those mentioned above. In particular, the stress measured by the capacitive sensors is normal to the surface of the shell. It is therefore a function of tilting the capacitive sensors and can strongly vary during use, if the touch-sensitive shell against which the capacitive sensors are arranged changes tilt.

That is the reason why a solution based on means for mechanical stress compensation equipped with adjustable counterweights is proposed in the patent FR 3 003 030 B1. Such a mechanism protects the capacitive sensors against tilt changes, also improving the precision of their measurements.

However, this does not completely solve the problem raised by increased shear stress forces that the sensors are subjected to when the tilt increases, and in particular, when the interactive shell is a vertical partition. In addition, such a mechanism remains excessively sensitive to the conditions at the localized limits at the periphery of the interactive shell, in particular, the peripheral conditions thereof of attachment to or housing in a mounting. Finally, this mechanism is quite complex, therefore expensive.

In the patent EP 0 531 815 B1, recovering tangential shear stress forces in a vertical position of a touch-sensitive plate is ensured using attachment strips. But there again, the mechanism proposed remains too sensitive to the peripheral conditions of attaching the touch-sensitive plate to a mounting.

BRIEF SUMMARY

It can thus be desired to provide a shell mounting touch-sensitive interface, touch-sensitive shell and mechanical stress sensors which enable to overcome at least part of the above-mentioned problems and constraints, in particular, a touch-sensitive interface that has a peripheral area intended to be supported, in particular by attachment or housing, by the mounting thereof.

A touch-sensitive interface is therefore proposed, comprising:
 a shell mounting, and
 a touch-sensitive shell that has:
  a main area without attachment,
  a peripheral area, complementary to the main area, intended to be supported by the shell mounting,
  a first face, touch-accessible by a user,
  a second face, opposite the first face, against which are arranged supporting, in the main area, several mechanical stress sensors rigidly connected to the shell mounting, wherein several attachment elements are further provided with an attachment element associated with each sensor, arranged such that:

each attachment element establishes a localized attachment of the touch-sensitive shell against the shell mounting, at the border between the peripheral area and the main area wherein the sensor to which it is associated is arranged, and each sensor, rigidly connected to the shell mounting at a constant non-zero distance from the localized attachment established by the attachment element to which it is associated, is subject to a predetermined out of charge minimal mechanical stress, so as to create an out of charge mechanically prestressed pivot link between the touch-sensitive shell and the shell mounting around said localized attachment.

Thus, thanks to the mechanically prestressed pivot links established near each one of the sensors from localized attachments between the shell mounting and the touch-sensitive shell, the touch-sensitive sensitivity of the resulting interface in the main area thereof is made separate from the possible attachments or housings of the shell in the peripheral area thereof, because there is no recovery of forces beyond the border between the main area and the peripheral area. In this way, the touch-sensitive interface can be arranged vertically with any suitable attachment or housing means for holding it in position in the peripheral area of the touch-sensitive shell thereof without this imposing shear stresses on the sensors and without this obstructing the measurements. Moreover, any stress applied on the first touch-accessible face of the touch-sensitive shell, creates, thanks to the pivot links also, a couple of forces measurable at the level of each sensor, the measurements of these couples enabling to find the localization of the stress by a barycentric calculation, similar to that outlined in U.S. Pat. No. 3,657,475.

Optionally, a touch-sensitive interface according to the invention can further comprise:

means for measuring electrical values at the terminals of each one of the sensors, and means for estimating and localizing a stress applied against the first touch-accessible face according to the electrical values measured and the predetermined out of charge minimal mechanical stress.

Optionally also, each pivot link, created by one of the sensors and the attachment element to which it is associated, has a lever arm length defined by the distance between said localized attachment and the place of contact between said sensor and the touch-sensitive shell, and:

the estimation and localization means are programmed to deduce the localization of the stress applied, based only on the electrical values measured and the predetermined out of charge minimal mechanical stress, the lengths of the lever arms moreover being all equal, or the estimation and localization means are programmed to deduce the localization of the stress applied, based on the electrical values measured, the predetermined out of charge minimal mechanical stress, and each one of the lever arm lengths.

Optionally also, the predetermined out of charge minimal mechanical stresses imposed by the attachment elements associated with the sensors cause a convex deformation of the first touch-accessible face of the touch-sensitive shell, such as it extends 1 mm at the most from the shape thereof without any stress.

Optionally also, a touch-sensitive interface according to the invention can comprise two sensors and two associated attachment elements for a one-dimensional localization of stress applied against the first touch-accessible face.

Optionally also, a touch-sensitive interface according to the invention can comprise at least three sensors and at least three associated attachment elements for a two-dimensional localization of stress applied against the first touch-accessible face.

Optionally also, each attachment element associated with each sensor is a screw-nut system crossing the shell mounting and the touch-sensitive shell.

Advantageously:

the touch sensitive shell is formed in a material that has elastic properties, and the shell mounting comprises at least one housing element for housing at least one part of the peripheral area of the touch-sensitive shell.

Optionally, the touch-sensitive shell is a plate.

BRIEF DESCRIPTION OF THE DRAWINGS

The invention will be better understood based on the following description, given only as an example and made by referring to the appended drawings wherein.

DETAILED DESCRIPTION

Figure 1:
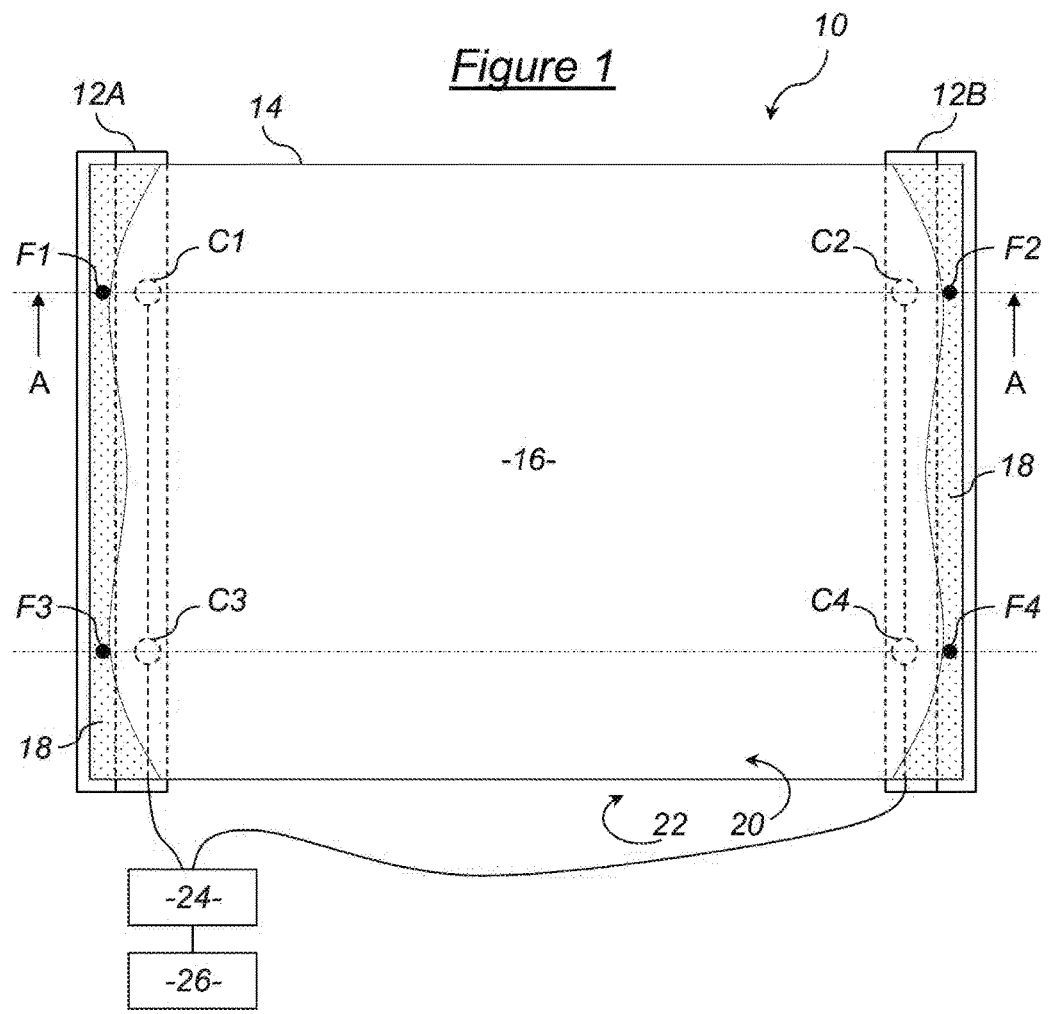
FIG. 1 represents schematically and in front view, the general structure of a touch-sensitive interface according to an embodiment of the invention.

The touch-sensitive interface 10 represented in front view in FIG. 1 comprises a mounting 12A, 12B and a touch-sensitive shell 14 intended to be supported by this mounting 12A, 12B. The touch-sensitive shell 14 is more specifically a rectangular plate in the example in FIG. 1, formed in a material that has elastic properties. In this case, the shell mounting 12A, 12B comprises at least one housing or attachment element of the plate 14 near the edges thereof, for example, two mounts 12A and 12B represented vertically in FIG. 1. The touch-sensitive shell 14 can generally be of any shape, size, material(s) and arrangement, and the mounting 12A, 12B thereof can support it in different ways, by attachment, housing or otherwise, by taking any suitable form.

The plate 14 has a main area 16 without attachment, sensitive to touch. It also has a peripheral area 18 intended to be supported by the mounting 12 and complementary to the main area 16. This peripheral area 18 is represented shaded in FIG. 1. As will subsequently be seen, this peripheral area 18 is made insensitive to touch and does not impede the detection of touches in the main area 16.

The plate 14 also has a first face 20, that can be seen in FIG. 1, accessible to the touch of a user, and a second face 22, opposite the first face 20, against which are arranged supporting, in the main area 16, four mechanical stress sensors C1, C2, C3, C4 rigidly connected to the mounting 12A, 12B. These sensors can be piezoelectric, capacitive or otherwise. Preferably, they are capacitive as cheaper. More specifically, the capacitive sensor C1 is arranged against the top-left part of the main area 16, by being attached to the mount 12A of the mounting 12A, 12B. The capacitive sensor C2 is arranged against the top-right part of the main area 16, by being attached to the mount 12B of the mounting 12A, 12B. The capacitive sensor C3 is arranged against the bottom-left part of the main area 16, by being attached to the mount 12A of the mounting 12A, 12B. The capacitive sensor C4 is arranged against the bottom-right part of the main area 16, by being attached to the mount 12B of the mounting 12A, 12B.

Four attachment elements F1, F2, F3, F4, with one attachment element Fi associated with each capacitive sensor Ci for i varying from 1 to 4, are further provided in the touch-sensitive interface 10. The attachment element F1 associated with the capacitive sensor C1, constituted, for example, of a screw-nut system crossing the plate 14 and the mount 12A of the mounting 12A, 12B, so as to establish a localized attachment of the plate 14 against the mounting 12A, 12B thereof, is arranged in the top-left part of the touch-sensitive interface 10 at proximity and constant non-zero distance from the capacitive sensor C1, at the border between the peripheral area 18 and the main area 16. The attachment element F2 associated with the capacitive sensor C2, constituted, for example, itself also of a screw-nut system crossing the plate 14 and the mount 12B of the mounting 12A, 12B, so as to establish a localized attachment of the plate 14 against the mounting 12A, 12B thereof, is arranged in the top-right part of the touch-sensitive interface 10 at proximity and constant non-zero distance from the capacitive sensor C2, at the border between the peripheral area 18 and the main area 16. The attachment element F3 associated with the capacitive sensor C3, constituted, for example, itself also of a screw-nut system crossing the plate 14 and the mount 12A of the mounting 12A, 12B, so as to establish a localized attachment of the plate 14 against the mounting 12A, 12B thereof, is arranged in the bottom-left part of the touch-sensitive interface 10 at proximity and constant non-zero distance from the capacitive sensor C3, at the border between the peripheral area 18 and the main area 16. The attachment element F4 associated with the capacitive sensor C4, constituted, for example, itself also of a screw-nut system crossing the plate 14 and the mount 12B of the mounting 12A, 12B, so as to establish a localized attachment of the plate 14 against the mounting 12A, 12B thereof, is arranged in the bottom-right part of the touch-sensitive interface 10 at proximity and constant non-zero distance from the capacitive sensor C4, at the border between the peripheral area 18 and the main area 16.

More specifically, the attachment elements themselves define the border between the main area 16 and the peripheral area 18 of the plate 14. By being arranged between the capacitive sensors and the edges of the plate 14, so as to attach to these places, the plate 14 against the mounting 12A, 12B thereof, they create this peripheral area 18 at the edges of the plate 12 wherein no touch can be detected, nor even affect the measurements taken by the capacitive sensors C1, C2, C3, and C4. Although arranged at the border between the main area 16 and the peripheral area 18, they are more specifically arranged on the side of the peripheral area 18.

Moreover, the relative arrangement of the attachment elements F1, F2, F3, F4 and the capacitive sensors C1, C2, C3, C4 on the mounts 12A and 12B is designed, in a manner known per se, and in particular, by playing on the thickness of the capacitive sensors, such that each capacitive sensor is subject to a predetermined minimal out of charge mechanical stress, so as to create an out of charge mechanically prestressed pivot link between the plate 14 and the mounting 12A, 12B around the localized attachment, materialized by the attachment element to which it is associated. The expression "out of charge" means without any touch from any user on the touch-accessible surface 20. This predetermined minimal out of charge stress can be as close as desired to the zero value, while remaining positive. In other words, it can asymptotically extend towards zero by positive values, according to the needs and constraints of a person skilled in the art.

Thus, the touch-sensitive sensitivity of the plate 14 in the main area 16 thereof is made separate from the possible other attachments or housings in the peripheral area 18 thereof, because there is no recovery of stresses beyond the border created by the attachment elements associated with the capacitive sensors. In this way, the touch-sensitive interface 10 can be arranged with any suitable attachment or housing means for holding it in a vertical position in the peripheral area 18 of the plate 14, without this imposing shear stresses on the capacitive sensors C1, C2, C3, C4 and without this having an impact on their measurements.

Moreover, by creating lever arms of predetermined lengths between the attachment elements F1, F2, F3, F4 and the associated capacitive sensors C1, C2, C3, C4, the latter have electrical values, in this case, electrical capacities, indicative of the force couples which are exerted on them.

To this end, the capacitive sensors C1, C2, C3, C4 are electrically connected to an apparatus 24 for measuring their respective capacities. This measuring apparatus 24 is known per se according to several possible embodiments and will not be detailed. It is, itself, connected to a calculator 26 forming means for estimating and localizing a stress applied against the first face 20 according to the capacities measured and to the predetermined minimal out of charge mechanical stress on each one of the capacitive sensors.

More specifically, the predetermined minimal out of charge mechanical stress imposed on each one of the capacitive sensors gives it an out of charge capacity. This is the difference, referenced $\Delta Ci$ for the capacitive sensor Ci, between this out of charge capacity and the capacity measured at a given moment which gives, in combination with the associated lever arm length, a value indicative of the force couple being exerted on the capacitive sensor Ci under the action of a stress applied against the first face 20 at this given moment. Conforming with the fundamental principle of dynamics, it is then very simple to localize the stress detected by barycentric calculation by assigning the localization of each capacitive sensor of a coefficient proportional to the force couple which is exerted on it.

The calculator 26 thus works as follows. On receiving the capacities measured, it deducts from these the stresses relating to a touch against the first face 20 which is exerted on the four capacitive sensors C1, C2, C3, C4 by subtracting the known out of charge capacities. Then, according to a first variant wherein the lengths of the four lever arms (F1, C1), (F2, C2), (F3, C3) and (F4, C4) are equal, the estimated stresses are directly translated into barycentric weighted coefficients, since they directly represent the amplitudes of the force couples which are exerted on the four capacitive sensors C1, C2, C3, C4. According to a second variant wherein the lengths of the four lever arms (F1, C1), (F2, C2), (F3, C3) and (F4, C4) can be any, each lever arm length is multiplied by the estimated stress on the corresponding capacitive sensor, and the result of the products serves as a set of barycentric weighted coefficients.

The calculator 26 can, for example, be implemented in a computerized device such as a conventional computer comprising a processor associated with one or more memories for storing data files and computer program instructions. The calculations thereof can also be, at least in part, microprogrammed or micro-cabled into dedicated integrated circuits. Thus, in a variant, the computerized device implementing the calculator 26 could be replaced by an electronic device composed only of digital circuits (without any computer program) to carry out the same actions.

Figure 2:
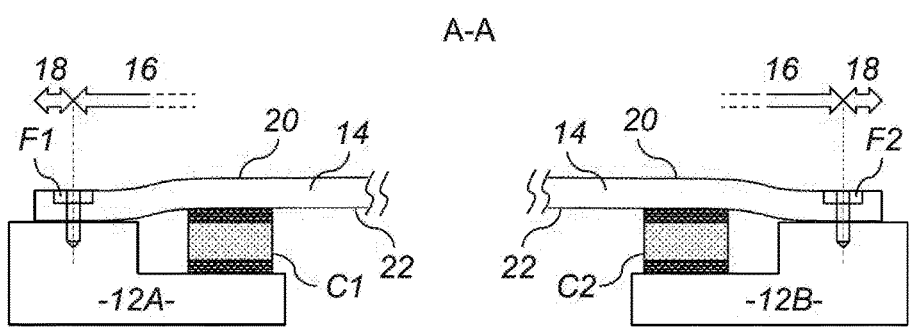
FIG. 2 is a cross-section view along an axis A-A of the touch-sensitive interface in FIG. 1.

FIG. 2 represents the touch-sensitive interface 10 in a cross-section along the axis A-A in FIG. 1 and according to an enlarged scale. Each one of the mounts 12A and 12B has, in this non-exhaustive example, an L-shaped section, so as to arrange the capacitive sensors C1, C2, C3, C4 in a situation of predetermined minimal out of charge mechanical stress by attachment of the plate 14 against the mounts 12A and 12B using the attachment elements F1, F2, F3, F4. This situation is obtained by ensuring that the surface of each capacitive sensor contacting the second face 22 of the plate 14 slightly exceeds, for example so as to remain invisible, the contact surface between the plate 14 and the mounting 12A, 12B thereof. This causes a general convex deformation of the first face 20 of the plate 14, which can itself be invisible. For example, this deformation is such that the plate 14 extends 1 mm at the most from the flat shape thereof without any stress.

A specific advantage of this convex deformation is to increase the sensitivity of the touch-sensitive interface. The plate 14 thus deformed indeed tends to want to go back to the original shape thereof without any stress, such that any stress, even minimal, applied by a user against the first touch-accessible face 20 will go in the direction of this return from the plate 14 to the original shape thereof, and is easily detected.

It will be noted that by aligning the attachment elements and associated capacitive sensors F1, C1, F2, C2 on the same axis A-A, an axis of maximum sensitivity to touch is obtained on the plate 14, along which the plate 14 is particularly tense by prestress. Another axis of maximum sensitivity to touch is obtained by aligning, in the same way, the attachment elements and associated capacitive sensors F3, C3, F4, C4.

Figure 3:
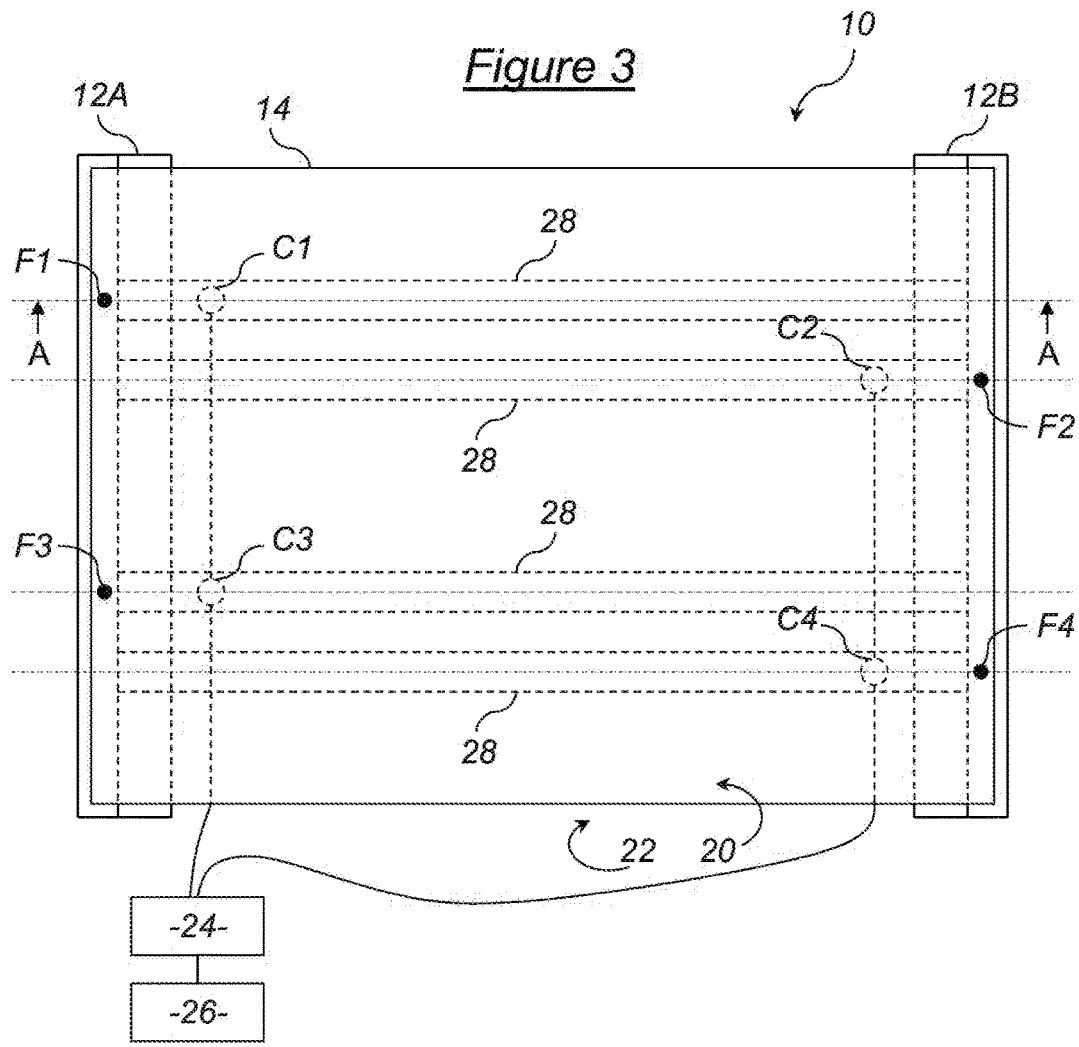
FIG. 3 represents schematically and in front view, the general structure of a touch-sensitive interface according to another embodiment of the invention.

In a variant, as illustrated in the embodiment in FIG. 3, it is not necessary to align the attachment element F1 and the associated capacitive sensor C1 thereof (still on the same axis A-A) with the attachment element F2 and the associated capacitive sensor C2 thereof. This is the same for the attachment elements and associated capacitive sensors F3, C3, F4, C4. The four lever arms formed by the couples (F1, C1), (F2, C2), (F3, C3) and (F4, C4) thus enable to constitute four axes of maximum sensitivity, this maximum sensitivity however being less than that of the embodiment in FIGS. 1 and 2. More generally, it is possible to modify at will the arrangement of the capacitive sensors and their associated attachment elements in order to modify the deformation of the plate 14 and the distribution of the sensitivity thereof, by however consequently adapting the barycentric calculation made by the calculator 26.

Figure 4:
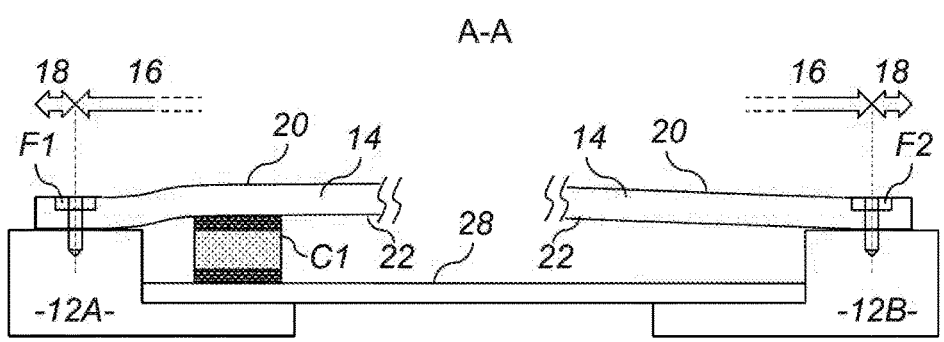
FIG. 4 is a cross-section view along an axis A-A of the touch-sensitive interface in FIG. 3.

In a variant also, as illustrated in FIG. 4, which represents the touch-sensitive interface in FIG. 3 in a cross-section A-A on an enlarged scale, the capacitive sensors can be not directly attached on the mounts 12A and 12B, but on transversal sliders 28, themselves attached on the mounts 12A and 12B. It is also possible to provide a frame supporting the capacitive sensors C1, C2, C3, C4 and attached by screwing to the plate 14 using the attachment elements F1, F2, F3, F4 without needing the mounts 12A and 12B. In this case, the frame fulfills the function of mounting the plate.

As emerges implicitly from the above, and explicitly from the FIGS. 2 and 4, the attachment of each mechanical stress sensor C1, C2, C3, C4 to the mounting 12A, 12B is rigid: in other words, it enables no degree of freedom between the mechanical stress sensor C1, C2, C3 or C4 considered and the mounting 12A, 12B. Likewise, the local attachments of the plate 14 to the mounting 12A, 12B using the attachment elements F1, F2, F3, F4 are locally rigid: in other words, they enable locally, no degree of freedom between the plate 14 and the mounting 12A, 12B. In addition, this mounting 12A, 12B is itself rigid, such that no degree of freedom is permitted between the mechanical stress sensors C1, C2, C3, C4 and the attachment elements F1, F2, F3, F4 which are respectively associated with them: in other words, any relative movement between the mechanical stress sensors C1, C2, C3, C4 and the attachment elements F1, F2, F3, F4 is forbidden. This is what creates the pivot links defined above, by elasticity of the plate 14.

It clearly appears that a touch-sensitive interface such as one of those defined above, enables to use mechanical stress sensors, in particular capacitive sensors known to be cheap, while remaining insensitive to the conditions of the attachment or housing limits and insensitive also to tilting, in particular, vertical, of the shell or touch-sensitive plate thereof. Experiments have shown that such a touch-sensitive interface is particularly well suited for detecting relative movements, in other words, successive touches of which the exact localization is less important than the recognition of the movement that they reproduce. By adapting the calculator 26 to this end, according to known techniques moreover, it is thus possible to recognize complex movements, alphanumeric or symbolic character scripture, for example.

Moreover, it will be noted that the invention is not limited to the embodiments defined above.

In particular, it is not necessary to provide four capacitive sensors, two capacitive sensors and two associated attachment elements could be sufficient for a one-dimensional localization of stress applied against the first touch-accessible face. At least three capacitive sensors and at least three associated attachment elements are, however, necessary for a two-dimensional localization. More sensors and associated attachment elements can further be provided in order to homogenize the sensitivity of the shell of touch-sensitive plate by increasing the number of axes of maximum sensitivity.

It will appear more generally to a person skilled in the art that various modifications can be brought to the embodiments defined above, in light of the information which has just been disclosed. In the claims which follow, the terms used must not be interpreted as limiting the claims to the embodiments described in the present description, but must be interpreted to include all equivalents here that the claims aim to cover, because of how they are worded and what the expectation is to the scope of a person skilled in the art, by applying their general knowledge to the implementation of the information which has just been disclosed to them.

The invention claimed is:

1. A touch-sensitive interface comprising:
   a shell mounting;
   a touch-sensitive shell that has:
      a main area without attachment,
      a peripheral area, complementary to the main area, intended to be supported by the shell mounting,
      a first face, touch-accessible by a user, and
      a second face, opposite the first face; and
   several mechanical stress sensors rigidly connected to the shell mounting, each sensor being in direct contact with the main area of the touch-sensitive shell to support the main area, wherein, the touch-sensitive shell being formed in a material that has elastic properties, several separate attachment elements are further provided, with each of the attachment elements being associated with a closest sensor of the sensors, arranged such that:

each attachment element establishes a localized attachment of the touch-sensitive shell against the shell mounting, at the border between the peripheral area and the main area wherein the sensor to which it is associated is arranged, each sensor, rigidly connected to the shell mounting at a constant non-zero distance from the localized attachment established by the attachment element to which it is associated, is subject to a predetermined out of charge minimal mechanical stress, so as to create, by elasticity of the touch-sensitive shell, an out of charge mechanically prestressed pivot link between the touch-sensitive shell and the shell mounting around said localized attachment, and wherein the shell mounting comprises at least one housing element that directly contacts at least one part of the peripheral area of the touch-sensitive shell and the at least one housing element receives each of the attachment elements and each of the associated closest sensors to generate the pivot link.

2. The touch-sensitive interface as claimed in claim 1, further comprising:

means for measuring electrical values at the terminals of each one of the sensors, and means for estimating and localizing a stress applied against the first touch-accessible face according to the electrical values measured and the predetermined out of charge minimal mechanical stress.

3. The touch-sensitive interface as claimed in claim 2, wherein each pivot link, created by one of the sensors and the attachment element to which it is associated, has a lever arm length defined by the distance between said localized attachment and the place of contact between said sensor and the touch-sensitive shell, and:

the estimation and localization means are programmed to deduce the localization of the stress applied, based only on the electrical values measured and the predetermined out of charge minimal mechanical stress, the lengths of the lever arms moreover being all equal, or the estimation and localization means are programmed to deduce the localization of the stress applied, based on the electrical values measured, the predetermined out of charge minimal mechanical stress, and each one of the lever arm lengths.

4. The touch-sensitive interface as claimed in claim 1, wherein the predetermined out of charge minimal mechanical stresses imposed by the attachment elements associated with the sensors cause a convex deformation of the first touch-accessible face of the touch-sensitive shell.

5. The touch-sensitive interface as claimed in claim 4, wherein the first touch-accessible face of the touch-sensitive shell extends 1 mm at the most from the shape thereof without any stress.

6. The touch-sensitive interface as claimed in claim 1, further comprising two sensors and two associated attachment elements for a one-dimensional localization of stress applied against the first touch-accessible face.

7. The touch-sensitive interface as claimed in claim 1, further comprising at least three sensors and at least three associated attachment elements for a two-dimensional localization of stress applied against the first touch-accessible face.

8. The touch-sensitive interface as claimed in claim 1, wherein each attachment element associated with each sensor is a screw-nut system crossing the shell mounting and the touch-sensitive shell.

9. The touch-sensitive interface as claimed in claim 1, wherein the touch-sensitive shell is a plate.

10. The touch-sensitive interface as claimed in claim 2, wherein the means for measuring electrical values includes a measuring apparatus and the means for estimating and localizing a stress includes a calculator.

\* \* \* \* \*